United States Patent
Jonasson et al.

(10) Patent No.: US 8,992,816 B2
(45) Date of Patent: Mar. 31, 2015

(54) METHOD AND APPARATUS FOR PRODUCING THREE-DIMENSIONAL OBJECTS

(75) Inventors: Daniel Jonasson, Göteborg (SE); Morgan Larsson, Västra Frölunda (SE); Ulf Ackelid, Göteborg (SE); Anders Snis, Uddevalla (SE); Tomas Lock, Göteborg (SE)

(73) Assignee: Arcam AB, Molndal (SE)

( * ) Notice: Subject to any disclaimer, the term of this patent is extended or adjusted under 35 U.S.C. 154(b) by 193 days.

(21) Appl. No.: 12/810,602

(22) PCT Filed: Jan. 3, 2008

(86) PCT No.: PCT/SE2008/000007
§ 371 (c)(1),
(2), (4) Date: Jun. 25, 2010

(87) PCT Pub. No.: WO2009/084991
PCT Pub. Date: Jul. 9, 2009

(65) Prior Publication Data
US 2010/0270708 A1    Oct. 28, 2010

(51) Int. Cl.
*B29C 67/00* (2006.01)
*B22F 3/105* (2006.01)

(52) U.S. Cl.
CPC .......... *B29C 67/0077* (2013.01); *B22F 3/1055* (2013.01); *B22F 2999/00* (2013.01); *B29C 67/0088* (2013.01); *B22F 2003/1056* (2013.01); *B22F 2003/1057* (2013.01)
USPC ....................................... 264/401

(58) Field of Classification Search
USPC ....................................... 264/401
See application file for complete search history.

(56) References Cited

U.S. PATENT DOCUMENTS

| 4,401,719 A | 8/1983 | Kobayashi et al. |
| 4,818,562 A | 4/1989 | Arcella et al. |

(Continued)

FOREIGN PATENT DOCUMENTS

| DE | 20305843 U1 | 7/2003 |
| EP | 0 289 116 | 2/1988 |

(Continued)

OTHER PUBLICATIONS
Office Action dated Nov. 8, 2011, U.S. Appl. No. 12/745,081.
(Continued)

*Primary Examiner* — Larry Thrower
(74) *Attorney, Agent, or Firm* — Alston & Bird LLP

(57) ABSTRACT

The invention concerns a method for producing three-dimensional objects (6) layer by layer using a powdery material which can be solidified by irradiating it with a beam (4) of charged particles, which method comprises the following steps: successive application of powder layers to a working area (5), and fusing together successive layers of said three-dimensional object (6) by successively irradiating the powdery layers with said beam (4). The invention is characterized in that it comprises the following steps: determining whether lifting of powdery material from the working area (5) occurs using a powder-lifting detection device (10, 10a, 10b, 10c, 10d, 10e) capable of generating a signal (S) upon detection of lifting of powdery material from the working area (5), and interrupting the irradiation of at least a part of the working area (5) where powder lifting occurs using the signal (S) generated by the powder-lifting detection device (10, 10a, 10b, 10c, 10d, 10e) for automatically trigging the interruption. The invention also concerns an apparatus (1) for producing three-dimensional objects (6) layer by layer using a powdery material which can be solidified by irradiating it with a beam (4) of charged particles, said apparatus (1) comprising means for successive application of powder layers to a work table, and a radiation gun (3) for delivering said beam (4) of charged particles, wherein the inventive apparatus (1) comprises a powder-lifting detection device (10, 10a, 10b, 10c, 10d, 10e) capable of generating a signal (S) upon detection of lifting of powdery material from the working area (5).

11 Claims, 3 Drawing Sheets

(56) References Cited

U.S. PATENT DOCUMENTS

| | | | |
|---|---|---|---|
| 4,863,538 | A | 9/1989 | Deckard |
| 5,182,170 | A | 1/1993 | Marcus et al. |
| 5,647,931 | A | 7/1997 | Retallick et al. |
| 5,753,274 | A | 5/1998 | Wilkening et al. |
| 5,837,960 | A | 11/1998 | Lewis et al. |
| 5,876,550 | A | 3/1999 | Feygin et al. |
| 5,904,890 | A | 5/1999 | Lohner et al. |
| 5,932,290 | A | 8/1999 | Lombardi et al. |
| 6,419,203 | B1 | 7/2002 | Dang |
| 6,554,600 | B1 | 4/2003 | Hofmann et al. |
| 6,583,379 | B1 | 6/2003 | Meiners et al. |
| 6,751,516 | B1 | 6/2004 | Richardson |
| 6,764,636 | B1 | 7/2004 | Allanic et al. |
| 6,824,714 | B1 | 11/2004 | Türck et al. |
| 7,165,498 | B2 | 1/2007 | Mackrill et al. |
| 7,204,684 | B2 | 4/2007 | Ederer et al. |
| 7,540,738 | B2 | 6/2009 | Larsson et al. |
| 7,686,605 | B2 | 3/2010 | Perret et al. |
| 7,799,253 | B2 | 9/2010 | Höchsmann et al. |
| 7,871,551 | B2 | 1/2011 | Wallgren et al. |
| 8,083,513 | B2 | 12/2011 | Montero-Escuder et al. |
| 2002/0104973 | A1 | 8/2002 | Kerekes |
| 2004/0084814 | A1 | 5/2004 | Boyd et al. |
| 2004/0104499 | A1 | 6/2004 | Keller |
| 2005/0186538 | A1* | 8/2005 | Uckelmann ............... 433/201.1 |
| 2006/0108712 | A1 | 5/2006 | Mattes |
| 2006/0157892 | A1 | 7/2006 | Larsson |
| 2007/0182289 | A1 | 8/2007 | Kigawa et al. |
| 2007/0298182 | A1 | 12/2007 | Perret et al. |
| 2011/0133367 | A1 | 6/2011 | Weidinger et al. |
| 2011/0316178 | A1 | 12/2011 | Uckelmann |

FOREIGN PATENT DOCUMENTS

| | | |
|---|---|---|
| EP | 0289116 | 11/1988 |
| EP | 0688262 A1 | 12/1995 |
| EP | 1418013 A1 | 5/2004 |
| EP | 1 721 725 | 11/2006 |
| EP | 1952932 A2 | 8/2008 |
| EP | 2011631 | 1/2009 |
| EP | 2119530 A1 | 11/2009 |
| EP | 2281677 A1 | 2/2011 |
| JP | 2003245981 | 9/2003 |
| SE | 524467 | 8/2004 |
| WO | WO 9308928 | 5/1993 |
| WO | WO 0185386 | 11/2001 |
| WO | WO 2004/054743 | 7/2004 |
| WO | WO 2004/056511 | 7/2004 |
| WO | WO 2006/091097 A2 | 8/2006 |
| WO | WO 2006/121374 | 11/2006 |
| WO | WO 2007/112808 | 10/2007 |
| WO | WO 2008/013483 A1 | 1/2008 |
| WO | WO 2008/057844 | 5/2008 |
| WO | WO 2008/125497 | 10/2008 |
| WO | WO 2008/147306 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2011/008143 A1 | 1/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |

OTHER PUBLICATIONS

International Search Report dated Sep. 4, 2010 for Application No. PCT/SE2009/050901.

International Search Report dated Sep. 2, 2008 for Application No. PCT/SE2007/001084.

International Preliminary Report on Patentability dated Nov. 27, 2009 for Application PCT/SE2007/001084.

European Search Report dated Feb. 16, 2012, for corresponding Application No. EP07 852 089.7.

Office Action dated Feb. 14, 2012 for U.S. Appl. No. 12/745,081.

International Search Report, mailed Sep. 17, 2008, of corresponding international Application No. PCT/SE2008/000007, filed Jan. 3, 2008.

United States Patent and Trademark Office, Final Office Action for U.S. Appl. No. 12/745,081, dated Jun. 21, 2012, 6 pages, USA.

United States Patent and Trademark Office, Notice of Allowance and Fee(s) Due for U.S. Appl. No. 13/144,451, mailed Sep. 25, 2012, 16 pages, USA.

International Searching Authority, International Search Report for International Application No. PCT/SE2011/050093, mailed Oct. 20, 2011 5 pages, The Swedish Patent and Registration Office, Sweden.

Cheah, Chi-Mun, et al., "Automatic Algorithm for Generating Comples Polyhedral Scaffold Structure for Tissue Engineering", Tissue Engineering, 2004, pp. 595-610, vol. 10, No. 3/4, XP002691483.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

International Preliminary Examining Authority (IPEA), Second Written Opinion for International Application No. PCT/EP2012/076025, mailed Dec. 4, 2013, 4 pages European Patent Office, Germany.

International Preliminary Examing Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, mailed Apr. 4, 2014, 15 pages, European Patent Office, Germany.

International Preliminary Examining Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.

International Searching Authority (ISA), International Search Report and Written Opinion for International Application No. PCT/EP2012/076025, mailed May 17, 2013, 11 pages, European Patent Office, The Netherlands.

International Searching Authority, International Search Report and Written Opinion for International Application No. PCT/EP2012/074383, mailed Feb. 27, 2013, 10 pages, European Patent Office, The Netherlands.

Weigel, TH., et al., "Design and Preparation of Polymeric Scaffolds for Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

United States Patent and Trademark Office, Office Action for U.S. Appl. No. 14/350,767, Nov. 24, 2014, 16 pages, USA.

International Searching Authority, International Search Report for International Application No. PCT/EP2012/058733, Mar. 5, 2013, 4 pages, European Patent Office, The Netherlands.

* cited by examiner

METHOD AND APPARATUS FOR PRODUCING THREE-DIMENSIONAL OBJECTS

CROSS REFERENCE TO RELATED APPLICATIONS

This application is a national stage application, filed under 35 U.S.C. §371, of International Application No. PCT/SE2008/000007, filed Jan. 3, 2008, which is hereby incorporated by reference in its entirety.

BACKGROUND OF THE INVENTION

1. Field of Invention

This invention relates to a method and apparatus for producing three-dimensional objects layer by layer using a powdery material which can be solidified by irradiating it with a beam of charged particles.

2. Description of Related Art

Equipment for producing a three-dimensional object layer by layer using a powdery material which can be solidified by irradiating it with electromagnetic radiation or an electron beam are known from e.g. U.S. Pat. No. 4,863,538, U.S. Pat. No. 5,647,931 and WO 2004/056511. Such equipment include for instance a supply of powder, means for applying a layer of powder on a work table, and means for directing the beam over the work table. The powder sinters or melts and solidifies as the beam moves or sweeps over a working area of the work table.

When melting or sintering a powder using a high-energy beam, it is important to avoid exceeding the vaporization temperature of the powder, since otherwise the powder will vaporize instead of forming the intended product. US 2005/0186538 discloses a method focusing on this problem. In this method a laser beam repeatedly is directed to the same powder target area during the melting/sintering phase as to step-wise raise the powder temperature. This way, a too high powder temperature is avoided.

When using an electron beam, or other charged particle beam, instead of a laser beam the situation is in some ways different. As the beam of charged particles interacts with the powdery material in a small area it causes heating of the irradiated area but also transfer of charges from the beam particles into the exposed area. The charges are transported out from the exposed area partly through the surrounding powdery material at a rate determined by the electrical conductivity of the powdery material and partly through secondary electron emission from the exposed area. Depending on the intensity of the charged particle beam, the electrical conductivity of the powdery material and the efficiency of secondary electron emission, the powdery material may, in some regions, reach an amount of charging high enough for the electrostatic force between the charged particles at the surface and underlying charged particles to overcome the force of gravity. Thus at this point charged powder particles will lift from and leave the working area and move around above the powder bed. This phenomenon propagates to surrounding areas of the powder layer resulting in a massive powder discharge or lift-off where large amounts of powder will whirl around above the powder bed and perhaps around the entire irradiation chamber. A result of a massive powder lift-off is that the powder particles that have left the working area interfere with the beam and that the structure of the powder layer is destroyed. When this happens, the production process must be interrupted in order to remove the spread-out powder and apply a new layer of powder onto the working table. These procedures take some time to complete and, in the interest of process stability and production rate, it is important to avoid such powder discharges.

Applying the method according to US 2005/0186538 to a powder melting/sintering device equipped with an electron beam is likely to give a poor result since no measures are taken in that method to avoid powder lift-off.

One solution to the problem of avoiding discharges is to add conductive material, such as carbon, to the powder as to increase the electrical conductivity of the powder. Disadvantages of this solution are, however, that the solidifying process of such a powder mixture may be difficult to control and that the properties of the formed product may be affected in a negative way. For instance, the mechanical strength may be decreased.

To lower the probability for powder lifting to occur it may be possible to increase the conductivity in the surrounding powder by performing a more thorough heating or sintering. However, such a procedure increases the time of building a three-dimensional body and because production time is an important parameter this approach is not fully satisfying.

There is thus still a need for improvements in the field of handling lift-off of powder from the work table.

BRIEF SUMMARY OF THE INVENTION

The object of this invention is to provide a method and apparatus for producing three-dimensional objects using powder layers and a charged particle beam, which method and apparatus exhibit improved properties compared to conventional methods and apparatuses with regard to handling of powder lifting from the work table. This object is achieved by the method and apparatus defined by the technical features contained in independent claims 1 and 10. The dependent claims contain advantageous embodiments, further developments and variants of the invention.

The invention concerns a method for producing three-dimensional objects layer by layer using a powdery material which can be solidified by irradiating it with a beam of charged particles, which method comprises the following steps: successive application of powder layers to a working area, and fusing together successive layers of said three-dimensional object by successively irradiating the powdery layers with said beam. The inventive method is characterized in that it comprises the following steps: i) determining whether lifting of powdery material from the working area occurs using a powder-lifting detection device capable of generating a detection signal upon detection of lifting of powdery material from the working area, and ii) interrupting the irradiation of at least a part of the working area where powder lifting occurs using the detection signal generated by the powder-lifting detection device for automatically trigging the interruption.

Such a method has the advantageous effect of making it possible to automatically suppress the unwanted powder lifting effect at an early stage before it has led to harmful contamination or charge transfer into surrounding areas of the powder layer, which harmful contamination or charge transfer often leads to a major powder lift-off, complete discontinuation of the building of the three-dimensional part and the necessity to restart the building sequence from the start. An early suppression of the lifting effect makes it possible to restart the building of the three-dimensional object after the lifting effect has settled leading to a significant saving of building material and time for the completion of the three-dimensional object.

Since the inventive method makes the powder lifting phenomenon less harmful, a further advantage is that less time and effort needs to be spent on developing methods and material etc. for avoiding powder lift-off. The inventive method can of course also be used in connection with various actions for avoiding powder lifting. In such a situation the inventive method works more as a safety system that is activated when the normal systems fail. The risk of powder lifting to occur is probably always present even if various precautions are taken.

In an advantageous embodiment of the invention the step of interrupting the irradiation of at least a part of the working area where powder lifting occurs is performed within a first time-period starting at a point of time when the detection signal is created, wherein the first time-period is less than 5 seconds. Preferably, the first time-period is less than 500 ms, more preferably less than 50 ms. Because it normally is an advantage to suppress the powder-lifting effect as quickly as possibly, it is normally an advantage if this first time-period is as short as possible. Suitable time-periods depend e.g. on sensitivity of detection device, type of powder, beam power etc. In some applications a few seconds may be sufficient. In other applications time-periods of one or two orders of magnitude lower than that should be used.

In an advantageous embodiment of the invention the step of interrupting the irradiation of at least a part of the working area where powder lifting occurs is performed by turning off the beam. This is a safe way of interrupting the powder lifting process.

In an advantageous embodiment of the invention the step of interrupting the irradiation of at least a part of the working area where powder lifting occurs is performed by guiding the beam into another direction. The beam can be guided outside the working area or towards other parts of the working area. In certain applications it is an advantage to avoid turning off and on the beam. It may also be useful to continue irradiating other parts of the working area, e.g. for heating purposes. If the beam is guided such as to irradiate other parts of the working area, the beam is preferably operated with a reduced average beam power for avoiding powder lifting but still keeping up the temperature of the powder such as to keep up the production speed. Reduced average beam power can be achieved with a pulsed beam or by reducing the beam power.

In an advantageous embodiment of the invention the method further comprises the step of re-starting the irradiation of the part of the working area where powder lifting has occurred. Preferably, the re-starting of the irradiation is carried out automatically after a certain, second time-period from the step of interrupting the irradiation. If the powder-lifting effect has been quickly interrupted it is likely that a new powder layer is not required and that the irradiation simply can be continued. This second time-period is in such a case preferably in the order of a few seconds. The second-time period may be set to be a function of the first time period.

In an advantageous embodiment of the invention the method further comprises the step of modifying certain operation parameters, such as heating parameters, before re-starting the irradiation. This way further powder lifting events can be avoided.

The invention also concerns an apparatus for producing three-dimensional objects layer by layer using a powdery material which can be solidified by irradiating it with a beam of charged particles, said apparatus comprising means for successive application of powder layers to a work table, and a radiation gun for delivering said beam of charged particles. The inventive apparatus further comprises a powder-lifting detection device capable of generating a signal upon detection of lifting of powdery material from the working area. Such an apparatus makes it possible to rapidly and automatically detect powder-lifting events. Preferably, the apparatus is arranged to use the detection signal created by the powder-lifting detection device for automatically trigging interruption of the irradiation of at least a part of the working area where powder lifting occurs. Such an apparatus is suitable for being operated by the inventive method.

In an advantageous embodiment of the inventive apparatus the powder-lifting detection device comprises a detection unit that is capable of generating a primary signal that varies with varying amounts of powder particles present above or beside the working area. Thereby, the powder-lifting effect can be quantified.

In an advantageous embodiment of the inventive apparatus the powder-lifting detection device comprises a capacitor having two plates over which a voltage is applied, wherein the plate facing the working area is movable. Such a microphone type detection device has various advantages compared to other types of detectors. For instance, it is not affected by the electron beam and it is less costly.

In a preferred variant of this embodiment the apparatus is provided with a second powder-lifting detection device of the same type, wherein the second powder-lifting detection device is arranged to be insensitive to powder-lifting events, and wherein a difference signal from the two powder-lifting detection devices is used for generating the detection signal. This way true powder-lifting events can be distinguished from "false alarms" in the form of interferences, such as noise from the apparatus 1 and external knocks onto the chamber 2, which may create a detection signal if only one microphone detector is used.

BRIEF DESCRIPTION OF THE DRAWINGS

In the description of the invention given below reference is made to the following figures, in which.

DETAILED DESCRIPTION OF VARIOUS EMBODIMENTS OF THE INVENTION

Figure 1:
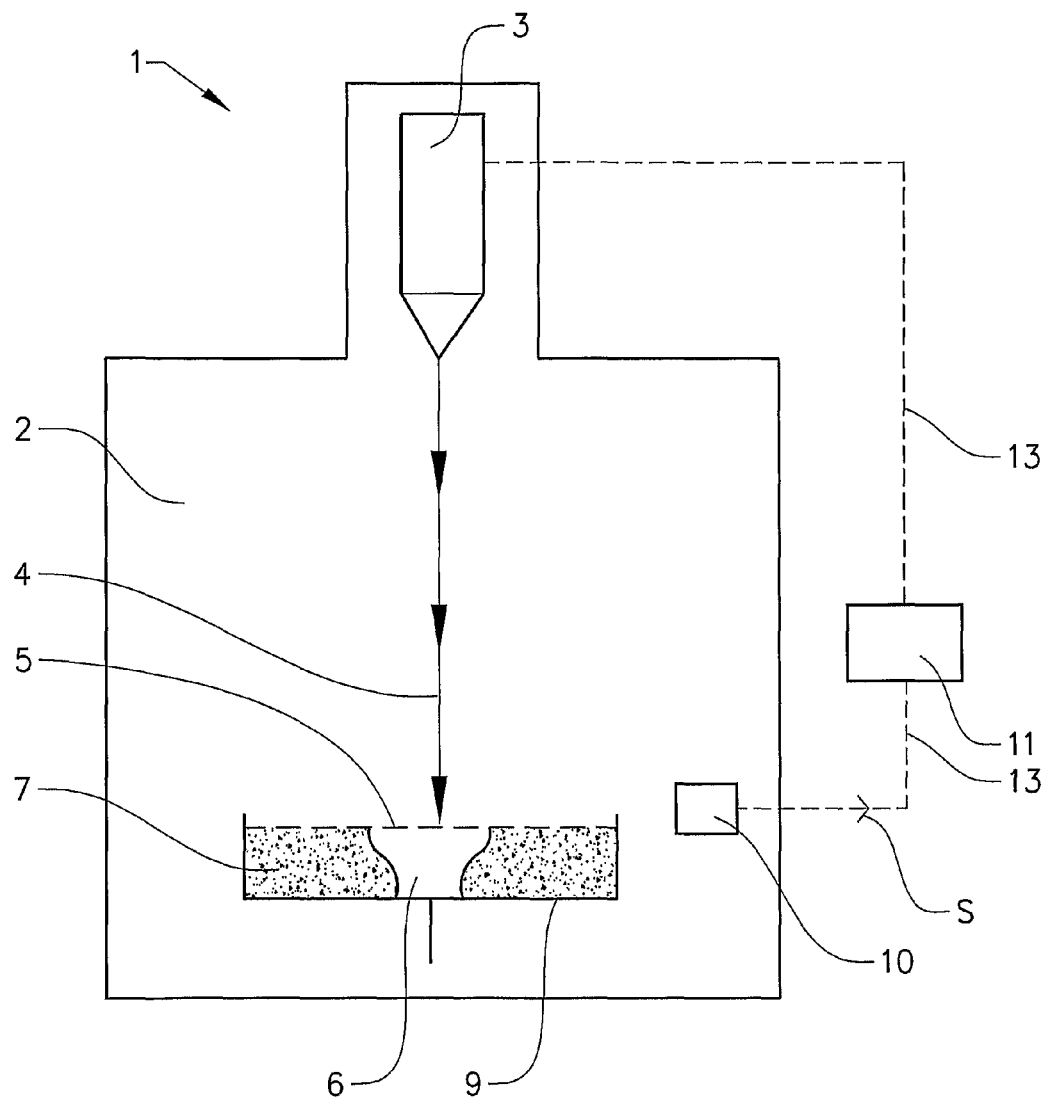
FIG. 1 shows, in a schematic view, a preferred embodiment of an apparatus according to the invention.

FIG. 1 shows, in a schematic view, a preferred embodiment of an inventive apparatus 1 for producing a three-dimensional object 6 layer by layer using a powdery material which can be solidified by irradiating it with an energy beam. The described apparatus 1 is suitable for applying the inventive method. The apparatus 1 comprises an electron gun 3 generating an electron beam 4 in an evacuated chamber 2. A powder bed 7 is positioned onto a height adjustable work table 9. Powder is taken from a powder supply (not shown) and applied layer by layer onto the working table 9. An upper part of the powder bed 7 forms a working area 5 over which the electron beam 4 sweeps during irradiation. After irradiation and fusing together of selected parts of the working area 5, a new layer of powder is distributed over the working area 5 on top of the powder bed 7. These parts, as well as how to control the electron gun 3, how to establish vacuum in the chamber 2 etc., are well known to the skilled man in the art.

In contrast to a conventional apparatus, the inventive apparatus 1 further comprises a powder-lifting detection device 10 for detection of lifting of powdery material from the working area 5, i.e. for detection of powdery material that has left the working area 5 and that is present above and/or aside of the working area 5. The detection device 10 is positioned inside the chamber 2 at a side of the working area 5 and is electronically connected to a control unit 11 that in turn is electronically connected to the electron gun 3 for controlling purposes, such as for directing the beam 4 and for turning on and off the beam 4. The electronic connections are indicated with dashed lines 13. The powder-lifting detection device 10 is arranged in such a way that it is capable of generating an electronic signal S upon detection of lifting of powdery material from the working area 5.

As described above, during irradiation of the working area 5 part of the powdery material may reach an amount of charging high enough for making powder particles begin to lift from and leave the working area 5 and move around above and beside of the powder bed 7. The powder-lifting detection device 10 detects such an event and generates an electronic detection signal S. This signal is sent to the control unit 11 which controls the electron gun 3 in such a way that the irradiation of the working area 5, or at least of a part of working area 5 where powder lifting occurs, is interrupted. Thus the electronic signal S created by the powder-lifting detection device 10 is used for automatically trigging the interruption. This way it is possible to prevent the lifting phenomenon from propagating to surrounding parts of the working area 5 and thereby it is possible to prevent a massive powder lift-off. If the powder-lifting process is interrupted sufficiently quickly it is possible to continue the production process without having to apply a new layer of powder.

Interruption of the irradiation of a part of the working area 5 can be carried out by turning off the beam 4 or by directing the beam 4 towards another part of the working area 5 or towards an area outside of the working area 5. If the beam 4 is directed towards another part of the working area 5, the average power of the beam 4 is preferably reduced for some time in order to avoid a new powder-lifting event but at the same time keep up the heat of the powder. A reduced average beam power can be achieved by reducing the beam power and/or by pulsing the beam.

Irradiation of the part of the working area 5 subject to powder-lifting is continued automatically after a certain, second time period which in this example is 5 seconds.

The powder-lifting detection device 10 is arranged to detect a powder-lifting event at an early stage so that it can be suppressed at an early stage and so that the irradiation can be continued after the relatively short second time period.

As a safety measure, the powder-lifting detection device 10 is also arranged to quantify the powder-lifting event, i.e. to quantify the amounts of powder that has lifted from the working area 5. Thus the powder-lifting detection device 10 is for instance capable of determining whether a major powder discharge has occurred. If the powder discharge is determined to exceed a certain level, a second electronic signal S2 is generated for cancelling or delaying the automatic re-start of the irradiation. In such a case it may be necessary to apply a new layer of powder onto the working area 5.

FIGS. 2-6 show, in schematic views, examples of powder-lifting detection devices 10a-10e for use with the apparatus shown in FIG. 1. These figures show parts of the powder bed 7 and the three-dimensional object 6 as well as the working area 5. Powder particles that have lifted from the working area 5 and that move around above and away from the working area 5 are indicated with arrows 15.

Figure 2:
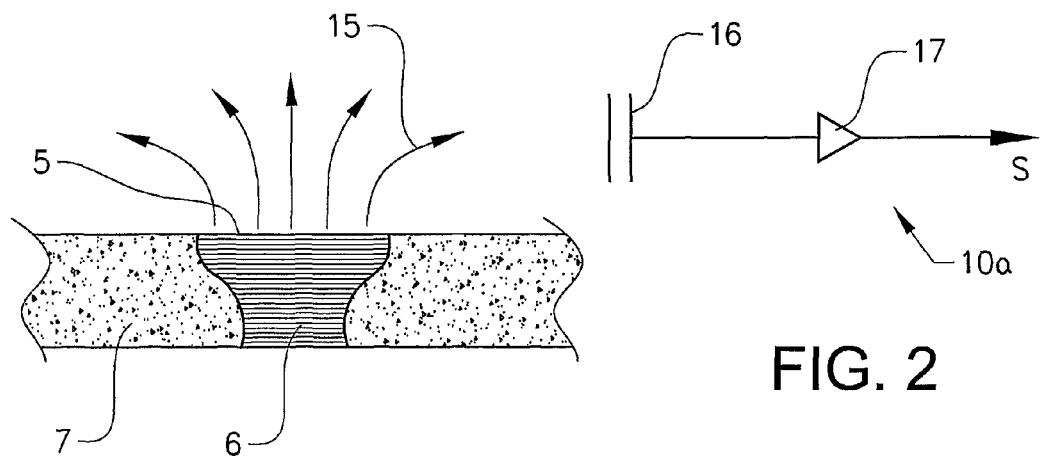
FIG. 2 shows, in a schematic view, a first example of a powder-lifting detection device for use with the apparatus shown in FIG. 1.

In FIG. 2 the powder-lifting detection device 10a is a type of capacitive microphone detector positioned at a side of the powder bed 7. This detection device 10a comprises a capacitor 16 having two plates over which a voltage is applied. The capacitor plate facing the working area 5, i.e. left plate in FIG. 2, is movable (i.e. flexible, deformable, etc.) whereas the other plate is stationary. Powder particles that lift from the working area 5 and hit the movable capacitor plate induce movements (deformations, vibrations, etc.) of the plate which influences the distance between the two plates and thus the capacitance of the capacitor 16. This change of capacitance can be converted to an electronic signal. An amplifier 17 is provided for amplifying the primary signal obtained from the capacitor 16 such as to generate the signal S used for interrupting the irradiation process as described above. Capacitor microphones are known as such and can be designed in different ways.

Figure 3:
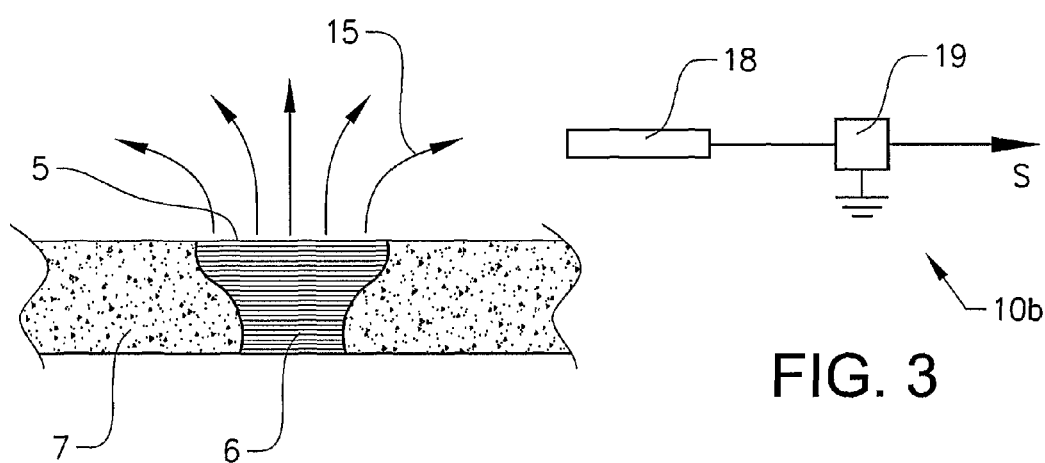
FIG. 3 shows, in a schematic view, a second example of a powder-lifting detection device for use with the apparatus shown in FIG. 1.

In FIG. 3 the powder-lifting detection device 10b is a type of Faraday cup detector positioned at a side of the powder bed 7. This detection device 10b comprises a conductive cup 18 and an electronic device 19 for measuring a current and for producing the electronic signal S. Powder particles that lift from the working area 5 and hit the cup 18 carry a charge acquired from the beam 4. These charges are collected by the cup 18 and the resulting current is measured by the device 19. If the current exceeds a certain value the signal S is generated. Faraday cups are known as such and can be designed in different ways.

Figure 4:
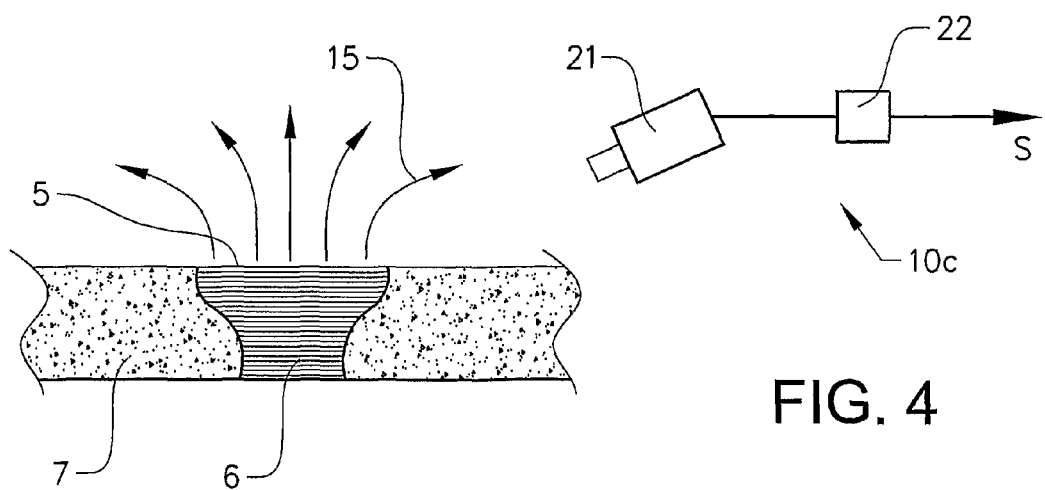
FIG. 4 shows, in a schematic view, a third example of a powder-lifting detection device for use with the apparatus shown in FIG. 1.

In FIG. 4 the powder-lifting detection device 10c comprises a camera 21 directed at an angle downwards towards the working area 5. The detection device 10c further comprises an image processing unit 22 capable of analyzing a signal from the camera 21 such as to identify whether powder-lifting occurs as well as of generating the electronic signal S if that is the case. Cameras and image processors are known as such and can be designed in different ways.

Figure 5:
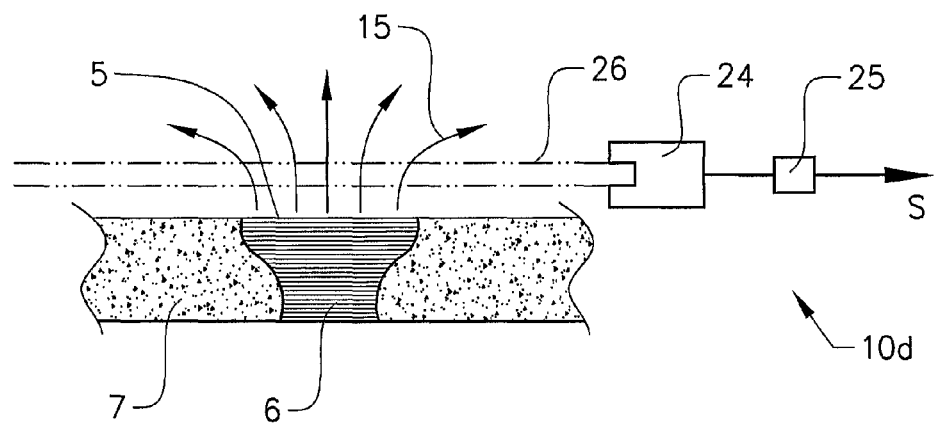
FIG. 5 shows, in a schematic view, a fourth example of a powder-lifting detection device for use with the apparatus shown in FIG. 1.

In FIG. 5 the powder-lifting detection device 10d comprises an X-ray detector 24 with a field of view 26 directed above and across the working area 5. Powder particles exposed to the beam 4 emit X-rays. If powder lifting occurs, X-ray emitting particles will be present in the field of view 26 of the X-ray detector 24 and will thus be detected by the X-ray detector 24. The detection device 10d further comprises a signal processing unit 25 capable of analyzing a signal from the X-ray detector 24 such as to identify whether powder-lifting occurs as well as of generating the electronic signal S if that is the case. X-ray detectors and signal processors are known as such and can be designed in different ways.

Figure 6:
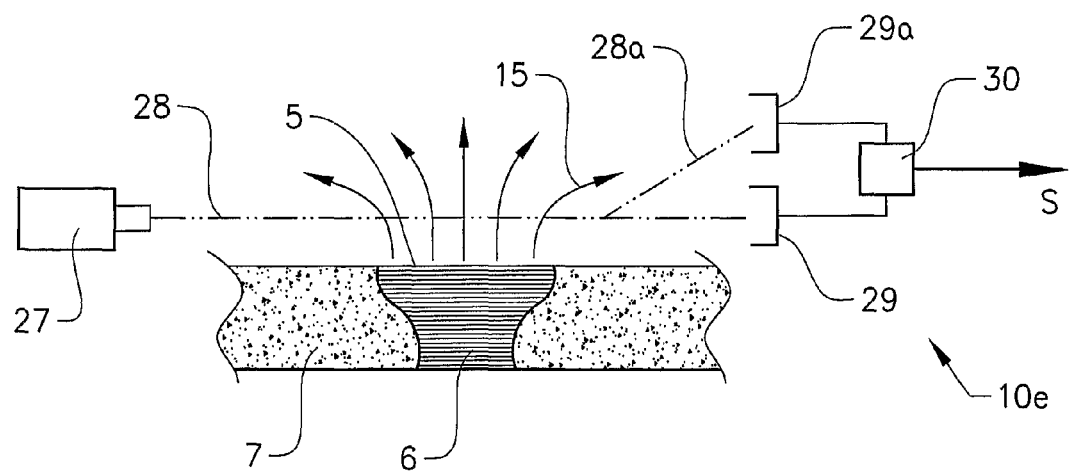
FIG. 6 shows, in a schematic view, a fifth example of a powder-lifting detection device for use with the apparatus shown in FIG. 1.

In FIG. 6 the powder-lifting detection device 10e comprises a laser source 27 capable of generating a laser beam 28 directed above and across the working area 5. If powder lifting occurs powder particles will be present in the path of the laser beam 28 resulting in scattering of the light in the laser beam 28. To detect powder lifting it is therefore possible to either detect a decrease in intensity of the original laser beam 28 or to detect an increase of scattered laser light 28a. A first light detector 29 is arranged to detect the intensity of the original laser beam 28 and a second light detector 29a is arranged to detect scattered laser light 28a. The detection device 10e further comprises a signal processing unit 30 capable of analyzing a signal from the light detectors 29, 29a such as to identify whether powder-lifting occurs as well as of generating the electronic signal S if that is the case. The powder-lifting detection device 10e may comprise either or both light detectors 29, 29a. Laser sources, light detectors and signal processors are known as such and can be designed in different ways.

All powder-lifting detection devices 10a-10e can be adapted to determine the amount of powder particles registered by the detector and not just to determine whether powder-lifting occurs, which means that the powder-lifting effect can be quantified. Thereby the powder-lifting detection devices 10a-10e become capable of generating the second electronic signal S2 mentioned above.

The response time of the detector 10, i.e. the time from detecting occurrence of lifting of powdery material until sending the signal S used for trigging interruption of the irradiation, is preferably as short as possible. The sensitivity and the positioning of the detector should be adjusted to the particular application.

All powder-lifting detection devices 10a-10e shown in FIGS. 2-6 comprises a detection unit, i.e. the capacitor 16, the cup 18, the camera 21, the X-ray detector 24 and the first and second light detectors 29, 29a, that is capable of generating a primary electronic signal that varies with varying amounts of powder particles present above or beside the working area 5.

The microphone detection device 10a shown in FIG. 2 is particularly advantageous because i) it is not affected by the electron beam (as a Faraday cup might be), ii) the signal strength is not dependent on the beam current (as is the case for the X-ray detector), and iii) it is simpler and less costly to implement compared to optical devices such as camera and laser which require considerations with regard to surface metallisation.

In a preferred variant of the invention the apparatus 1 is provided with a first and a second microphone detection device 10a of the type shown in FIG. 2. One of these, the first microphone detection device 10a, is arranged to detect powder-lifting as described above. The other, i.e. the second microphone detection device 10a, is arranged in or at the apparatus 1 in a similar way as the first one but is arranged to be insensitive to powder-lifting events. This can, for instance, be achieved by providing a shield between the working area 5 and the second detector or by positioning the capacitor 16 of the second detector such that the stationary plate faces the working area 5. The first and second microphone detection devices are further arranged in such a way that the individual signal generated from one of the detectors is subtracted from the individual signal generated by the other detector, wherein the resulting difference signal is analyzed such as to identify whether powder-lifting occurs as well as to generate the signal S if that is the case. This way true powder-lifting events can be distinguished from "false alarms" in the form of interferences, such as noise from the apparatus 1 and external knocks onto the chamber 2, which may create a detection signal S if only one microphone detector is used.

The invention is not limited by the embodiments described above but can be modified in various ways within the scope of the claims. For instance, the detection device 10 can be positioned in other places inside or outside the chamber or integrated in a wall of the chamber 2. In some applications it may be advantageous to use more than one detection device. Also other types of detection devices may be useful in order to apply the inventive method.

Although the various signals and connections described above are electronic it is of course possible also to use other types of means for communication, such as optical or other types of electromagnetic signals and connections.

The invention claimed is:

1. A method for producing a three-dimensional object layer by layer using a powdery material which can be solidified by irradiating the powdery material with a beam of charged particles, which method comprises the following steps:
    applying successive powder layers of the powdery material to a working area;
    fusing together successive layers of said three-dimensional object by successively irradiating at least a part of the working area where the powdery layers are applied with said beam;
    detecting lifting of at least a portion of the powdery material from the working area, said detecting being via a powder-lifting detection device configured for generating a detection signal upon the detection of the lifting of said at least a portion of the powdery material from the working area; and
    based upon the detection of said lifting and upon the generated detection signal, automatically interrupting the irradiation of at least a part of the working area where the powder lifting occurs.

2. The method according to claim 1, wherein:
    the step of interrupting the irradiation of at least a part of the working area where powder lifting occurs is performed within a first time-period starting at a point of time when the detection signal is created; and
    the first time-period is less than 5 seconds.

3. The method according to claim 2, wherein the first time-period is less than 500 ms.

4. The method according to claim 2, wherein the first time-period is less than 50 ms.

5. The method according to claim 1, wherein the step of interrupting the irradiation of at least a part of the working area where powder lifting occurs is performed by turning off the beam.

6. The method according to claim 1, wherein the step of interrupting the irradiation of at least a part of the working area where powder lifting occurs is performed by guiding the beam into another direction.

7. The method according to claim 6, wherein:
    the beam is guided such as to irradiate other parts of the working area; and
    the beam is operated with a reduced average beam power.

8. The method according to claim 1, further comprising the step of re-starting the irradiation of the part of the working area where powder lifting has occurred.

9. The method according to claim 8, wherein the re-starting of the irradiation is carried out automatically after a second time-period from the step of interrupting the irradiation.

10. The method according to claim 8, further comprising the step of modifying one or more operation parameters before re-starting the irradiation.

11. The method according to claim 10, wherein the one or more operation parameters comprise heating parameters.

* * * * *